Oct. 11, 1938.   P. P. CRISP ET AL   2,132,819
APPARATUS FOR MAKING RUBBER FENDERS
Filed July 13, 1935   2 Sheets-Sheet 1
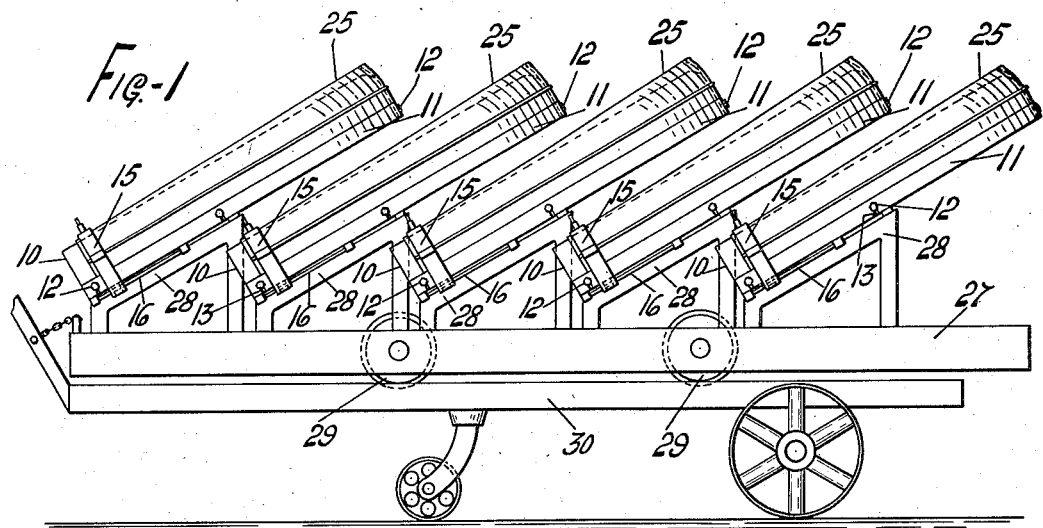
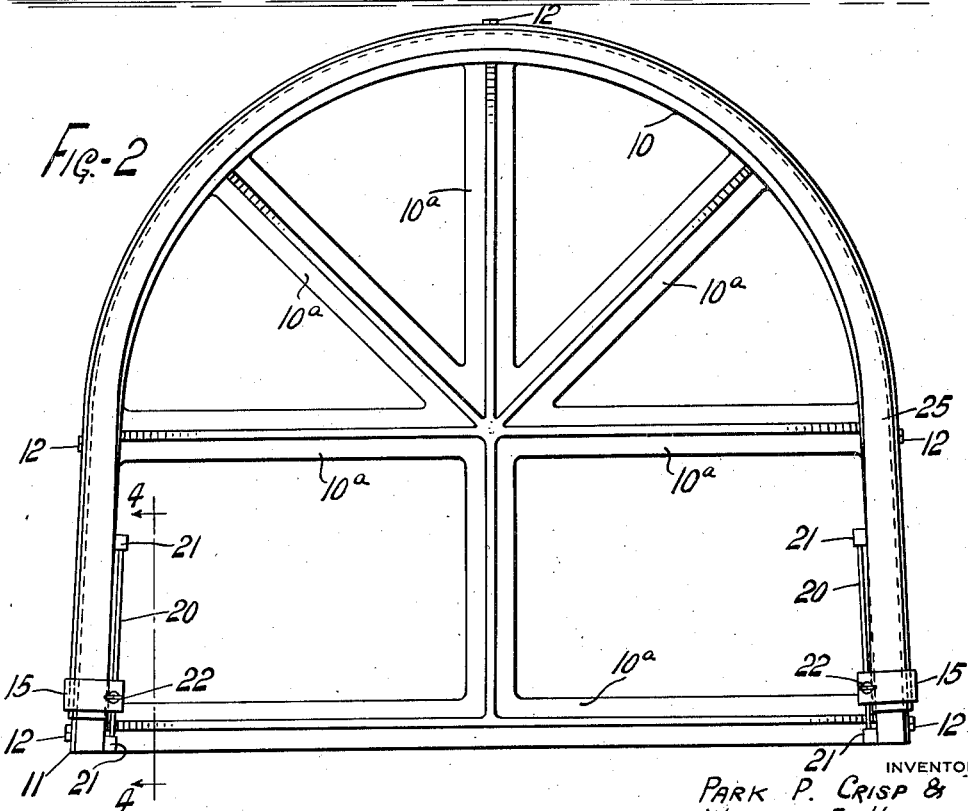
INVENTORS
PARK P. CRISP &
WILLIAM E. HAGGAN
BY
Albert L. Ely
ATTORNEY

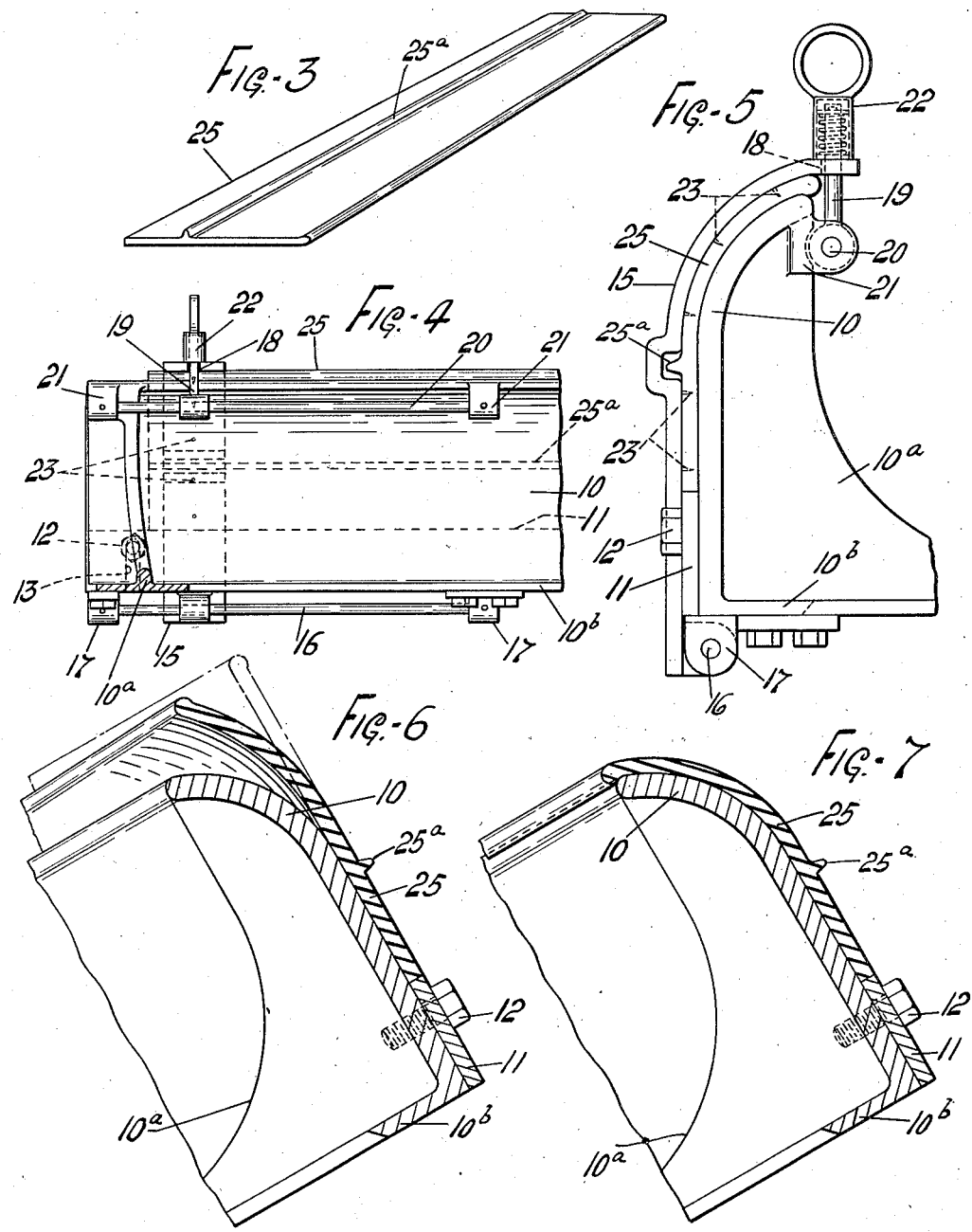

Patented Oct. 11, 1938

2,132,819

UNITED STATES PATENT OFFICE 2,132,819

APPARATUS FOR MAKING RUBBER FENDERS

Park P. Crisp, Stow, and William E. Haggan, Akron, Ohio, assignors to The Firestone Tire & Rubber Company, Akron, Ohio, a corporation of Ohio Application July 13, 1935, Serial No. 31,220

6 Claims. (Cl. 18—35)

This invention relates to methods of and apparatus for the manufacture of rubber goods that are generally of strip form and have longitudinal and transverse curvature, and more especially it relates to improved procedure and improved apparatus for the manufacture of rubber fenders for motor vehicles.

The chief objects of the invention are to provide an improved method for the expeditious vulcanization of rubber fenders for motor cars; and to provide improved and simplified apparatus for the practice of the improved method. More specifically the invention aims to effect the vulcanization of articles of the character mentioned in open heat, without the use of molds. Economies of time, labor, and equipment also are contemplated. Other objects will be manifest.

Of the accompanying drawings:

Figure 1 is a side elevation of a complete apparatus for use in concurrently vulcanizing a plurality of rubber fenders;

Figure 2 is a plan view of one of the forms upon which a work-unit is mounted during vulcanization, and the work thereon;

Figure 3 is a perspective view of a work-unit as it appears before being mounted upon a vulcanizing form;

Figure 4 is a section on the line 4—4 of Figure 2;

Figure 5 is an end view of the structure shown in Figure 4, on a larger scale, as viewed from the left thereof;

Figure 6 is a transverse section through the medial region of a vulcanizing form, and the work thereon, as they appear when in position for vulcanization, but before vulcanization begins; and Figure 7 is a view similar to Figure 6 showing the work as it appears at the completion of the vulcanizing operation.

Referring to the drawings, 10 designates a form or work support upon which the work is secured and supported during vulcanization. Said work-supporting form comprises a longitudinally arcuate structure upon the outer peripheral face of which the work may be mounted, said arcuate structure also being transversely arcuate in a region of substantial width along one lateral margin thereof. A removable, arcuate, longitudinally extending gauge plate 11 is secured to the work-supporting face of structure 10, by means of cap screws 12, along the margin thereof that is opposite said transversely arcuate margin, said plate constituting a guide against which a margin of the work abuts for properly positioning the latter on the support. The cap screws 12 extend through respective slots 13 that are disposed transversely in the gauge plate, the arrangement being such that said gauge plate may be adjusted laterally to accommodate the work support to work of various widths. As shown in Figure 2, the structure 10 describes an arc of substantially 180° and has slightly diverging extensions at its respective ends. It is laterally reinforced by a plurality of integral radial and transverse ribs 10$^a$, 10$^a$.

Work mounted upon the support 10 is secured thereto at its respective end portions, and to this end arcuate clamps 15 are positioned at the extensions at the respective ends of the arcuate structure 10. Each clamp is pivotally mounted at one of its ends upon a rod 16 that is supported between a pair of brackets 17, 17 that are secured to a flange 10$^b$ that extends inwardly from that margin of the structure upon which gauge plate 11 is mounted. The clamp is constructed and arranged to transverse the work-supporting surface of the support, and has its free end slotted at 18, Figures 5 and 4, to receive a latch-bolt 19 that is pivotally mounted upon a rod 20 that is supported between two brackets 21, 21. The latter are formed integral with the structure 10 on the inner periphery of the transversely arcuate marginal portion thereof. A spring-pressed keeper 22 is mounted on the free end of the latch-bolt and is adapted to engage with the clamp to retain the latch-bolt within the slot 18 therein. The clamps 15 and latch-bolts 19 are slidable longitudinally of their respective pivot rods 16 and 20 to the end that said clamps and latch-bolts may be positioned at different points so as to accommodate work of various lengths. Each clamp 15 has a longitudinal series of pins 23, 23 projecting from its concave face for the purpose of impaling the end portions of the work and holding the latter firmly to the support.

The work, designated 25, is shown in its initial form in Figure 3. It consists of an elongate strip or slab of unvulcanized rubber composition that may be formed in a continuous length, as by an extruding machine, and thereafter cut into individual units of the desired length. As shown, the work-unit is formed with one square longitudinal margin and one rounded or beaded longitudinal margin, and a longitudinally extending rib 25$^a$ on one face thereof, but it will be understood that these characteristics of the work may be varied without in any way affecting the invention.

Vulcanization of the work is effected in open heat in a horizontal vulcanizer (not shown) of usual construction while the supporting form 10 with the work thereon is disposed in determinate angular or inclined position with relation to the horizontal. To this end a carriage 27 is provided, which carriage carries a plurality of supporting frames 28, 28 that support respective forms 10 at an angle of 30°-35° to the horizontal, the medial, arcuate portion of each form being uppermost. This arrangement of the forms 10 is an important feature in effecting the vulcanization of the work, and it also permits an overlapping arrangement of the forms whereby economy of space is obtained. The carriage 27 may be provided with flanged wheels 29, 29 to permit it readily to be moved into and out of a vulcanizer that is provided with suitable track-rails, and a wheeled truck 30 may be provided for conveying the carriage 27 to and from the vulcanizer.

The method of practicing the invention with the previously described apparatus is as follows: An unvulcanized work-unit 25 is placed upon a supporting form 10 with its square margin abutting the edge of gauge-plate 11, assuming the position shown in broken lines in Figure 6. The work-unit is then stretched longitudinally about the form, each way from its middle, and its end portions secured in place by means of the respective clamps 15. The stretching of the work-unit elongates it about three inches at each end, and places the entire unit under longitudinal tension, with the result that the unsupported marginal portion of the unit, about the transversely arcuate marginal portion of the form, is constricted and drawn toward said arcuate portion of the form as is clearly shown in full lines in Figure 6.

The form 10 with the work 25 thereon is then mounted upon the carriage 27, in the inclined position shown in Figure 1, and the latter moved into a vulcanizer where the work is subjected to open, vulcanizing heat. During the initial phase of the vulcanizing operation, the rubber composition of the work softens, and, because of the force of gravity and the tension previously imparted to the work, the unsupported marginal portion of the latter is drawn inwardly until it rests upon the transversely arcuate portion of the form, as shown in Figure 7. In this position of the work the vulcanization thereof is completed so that it is permanently shaped in conformity with the longitudinal and transverse curvature of the form. After vulcanization the work is removed from the form, washed, and its ends trimmed to give it proper length.

The improved method is practiced with the relatively simple apparatus described, and the invention achieves the other objects set forth in the foregoing statement of objects. The work requires but little treatment after vulcanization to make it ready for use, and there are no overflow rands to be removed as is the case with articles vulcanized in cavity molds.

Modification may be resorted to without departing from the spirit of the invention or the scope of the appended claims, which are not limited wholly to the specific construction shown or exact procedure described.

What is claimed is:

1. In apparatus for making rubber articles, the combination of a work support, means for mounting an unvulcanized rubber article thereon under tension that is parallel to two opposite margins thereof of which one of said margins rests upon said support and the other is in spaced relation thereto, and means for supporting said work support in a position such that the unsupported marginal portion of the article is urged toward said support by gravity.

2. In apparatus for making rubber articles, the combination of a form that is curved longitudinally to describe an arc of not more than 180°, and has one lateral marginal portion that is arcuate transversely so as to present a convex surface to the outer face of the form, and clamping means at the respective ends of the form for engaging the respective ends of work thereon.

3. A combination as defined in claim 2 including an adjustable gauge-plate mounted upon and coextensive with the lateral marginal portion that is not transversely arcuate.

4. In apparatus for making rubber articles, the combination of a work-supporting form that is generally arcuate longitudinally, one lateral marginal portion of the form being convex on its outer periphery, a laterally adjustable gauge-plate on the outer periphery of the other marginal portion of the form, and means at the respective ends of the form for anchoring the work to the outer periphery of the form.

5. A combination as defined in claim 4 including means for adjusting the work-anchoring means longitudinally of the form.

6. In apparatus for making rubber articles, the combination of a longitudinally arcuate work support that is of irregular transverse shape so that a flat strip of material thereon will stand in spaced relation to a portion of the support, anchoring means at the respective ends of the support for maintaining an article in tensioned condition upon the outer perimeter of said support, and means for positioning the support in oblique position with relation to the horizontal.

PARK P. CRISP.
WILLIAM E. HAGGAN.